United States Patent [19]

Tsuyama

[11] Patent Number: 4,809,561
[45] Date of Patent: Mar. 7, 1989

[54] DOOR MIRROR

[75] Inventor: Osamu Tsuyama, Isehara, Japan

[73] Assignee: Ichikoh Industries Ltd., Tokyo, Japan

[21] Appl. No.: 828,525

[22] Filed: Feb. 12, 1986

[30] Foreign Application Priority Data

| Feb. 13, 1985 | [JP] | Japan | 60-25374 |
| Nov. 14, 1985 | [JP] | Japan | 60-175259[U] |
| Nov. 14, 1985 | [JP] | Japan | 60-175260[U] |
| Nov. 14, 1985 | [JP] | Japan | 60-175261[U] |

[51] Int. Cl.[4] .............................................. F16C 1/10
[52] U.S. Cl. .................................................... 74/502.1
[58] Field of Search .................... 74/501.5, 502.1; 350/625, 626, 627, 614, 615; 248/475.1, 476, 485, DIG. 1, 481, 483

[56] References Cited

U.S. PATENT DOCUMENTS

| 2,398,860 | 4/1946 | Ruddock | 74/501 R X |
| 2,931,245 | 4/1960 | Jacobson | 74/502.1 |
| 3,021,962 | 2/1962 | Minty et al. | 74/501.5 |
| 3,030,821 | 4/1962 | Jacobson | 74/502.1 |
| 3,195,370 | 7/1965 | Smith | 74/502.1 |
| 3,290,959 | 12/1966 | Hicks et al. | 74/501.5 |
| 3,407,684 | 10/1968 | Van Hoord | 74/501 M |
| 3,444,754 | 5/1969 | Liedel | 74/502.1 |
| 3,474,686 | 10/1969 | Liedel | 74/502.1 |
| 3,533,303 | 10/1970 | McIntyre | 74/502.1 |
| 3,618,420 | 11/1971 | Horwitt et al. | 74/502.1 |
| 4,080,049 | 3/1978 | Oskam et al. | 74/502.1 X |
| 4,235,046 | 11/1980 | Hess et al. | 74/501.5 X |

FOREIGN PATENT DOCUMENTS 2715335 10/1978 Fed. Rep. of Germany ..... 74/502.1

Primary Examiner—Gary L. Smith
Assistant Examiner—Rodney M. Lindsey
Attorney, Agent, or Firm—Foley & Lardner, Schwartz, Jeffery, Schwaab, Mack, Blumenthal & Evans

[57] ABSTRACT

Wires which are introduced from an operation rod into a mirror housing to adjust the swinging of a mirror are tensioned to a certain extent by a wire slack preventing member, which is located in the mirror housing, to precisely act the mirror without being loosened. Tubes through which the wires are inserted are positionally defined in a base and a fixed shaft to precisely guide the wires.

7 Claims, 8 Drawing Sheets

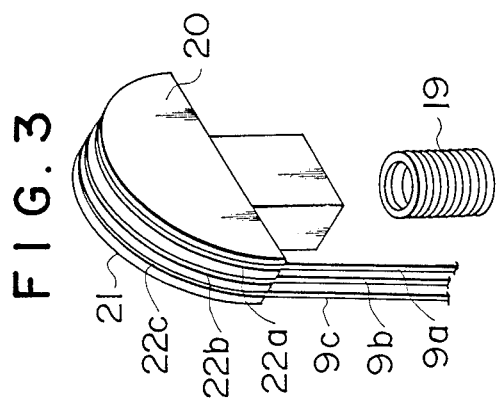
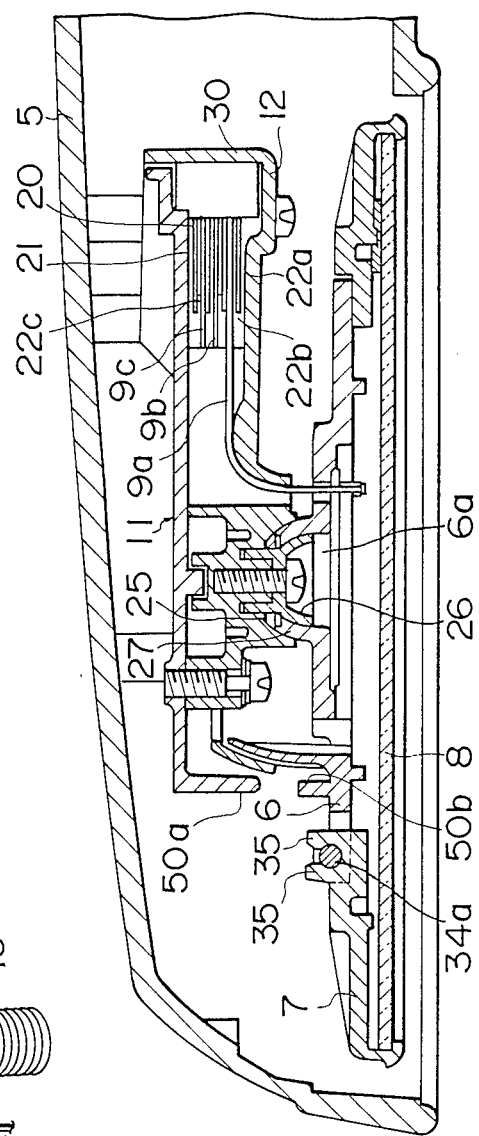

F I G. 12
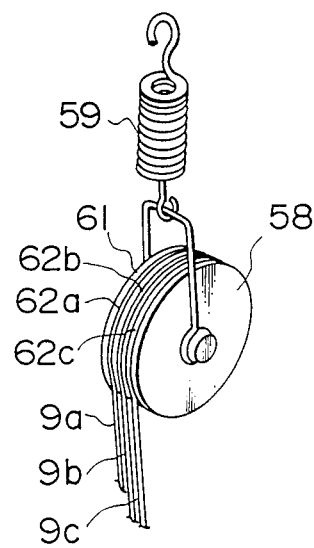

DOOR MIRROR

BACKGROUND OF THE INVENTION

1. Field of the Invention

The present invention relates to a door mirror of the wire remote control type.

2. Prior Art

As the door mirror whose angle can be adjusted by operation in the car room, there have been well known ones of the wire remote control type wherein plural wires are stretched between a mirror body which holds a mirror and an operation rod which is located in the car room, and wherein the wires are operated by the operation rod to pull and swing the mirror body.

In the case of the door mirror of this type, each of the wires is inserted through a tube and introduced from the operation rod at a base fixed to the door into a mirror housing through the inside of the base and a fixed hollow shaft erected in the base. These wires are slid through the tubes, when they are operated by the operation rod, to swing the mirror body. In the case of this door mirror, however, the wires contract and expand to make it difficult to precisely operate the mirror, when temperature shows large change because of local and seasonal reasons, for example.

There have also been provided collapsible door mirrors whose mirror housing can be collapsed along the side of the car body wherein a lock member is located between the mirror housing and a base which supports the mirror housing. In the case of this door mirror, the mirror housing is elastically shifted to a mirror setting position and held there by the lock member to stand wind pressure and the like. According to the elastic action of the lock member, the mirror housing is shifted in the direction of its coming near to or remote from the base. Relative positions of the mirror and the operation rod between which the wires are stretched are changed accordingly, and when the wires are to be stretched, therefore, it is needed that the wires are previously slackened to cover the positional changes between the mirror and the operation rod.

How to connect the wires to the operation rod in the case of these door mirrors is that an engagement member provided with engagement holes to correspond to the wires is attached to the bottom portion of the operation rod and that balls each connected to an end of each of the wires are engaged with the engagement holes, for example. The engagement member is swelled in the radius direction of the operation rod and each of the engagement holes in the engagement member is tapered in the direction of from the foremost end of the operation rod to the bottom thereof. Each of the wires is inserted through the engagement hole in this direction of from the foremost end of the operation rod to the bottom thereof and its ball connected to its last end is engaged with the engagement member. A sheet of packing made of rubber, for example, and provided with a hole through which the operation rod is inserted is attached to the bottom portion of the operation rod, covering the engagement member to prevent water from entering into the inside of the car from outside. In the case where the engagement member is covered only by the packing, some of the balls come out of the engagement holes toward the foremost end of the operation rod when the engagement member is shifted by the operation rod, thereby disturbing the precise transmission of the wires accordingly. In addition, when the door mirror is to be assembled, the balls come out of the engagement member, thereby making it difficult to determine the length of the wires.

SUMMARY OF THE INVENTION

According to a door mirror of the present invention, a housing is attached, through a support member, to a fixed shaft erected on a base which is fixed to a door, and a mirror freely swingably supported in the housing is operated by an operation rod, which is attached to the base, through plural wires. The slackening of each of the wires is absorbed by a slack-preventing member to precisely swing the mirror. Namely, each of the wires is tensioned to a certain extent or more by the slack-preventing member to precisely transmit the amount of the operation rod operated to the mirror.

In a preferred embodiment of the present invention, the slack-preventing member is provided every wire to precisely tension each of the wires.

In another preferred embodiment of the present invention, the slack-preventing member is provided with a wire passing member and a spring member to fully tension each of the wires.

In a further preferred embodiment of the present invention, a piece of plate spring serves as a slack absorbing member, which is simple in structure enough to prevent the wire from being slackened.

In a still further preferred embodiment of the present invention, the wire sliding portion is provided with a groove for guiding the wire to achieve precise wire pulling operation without tangling the wire.

In a still further preferred embodiment of the present invention, the groove formed through the wire sliding portion is covered by a lid to prevent the wire from coming out of the groove.

In a still further preferred embodiment of the present invention, the wire pressing member is a freely-rotatable pulley which enables each of the wires to be smoothly operated.

In a still further preferred embodiment of the present invention, tubes each keeping the wire inserted therethrough are fixed by a holder member in the base to prevent them from being slackened when the wires are pulled.

In a still further preferred embodiment of the present invention, the tubes through which the wires are inserted are positioned one another in a substantially close contact in the fixed shaft to enable each of the wires to be equally pulled.

In a still further preferred embodiment of the present invention, a washer is interposed between an end of each of the wires which is to be connected to an engagement member and the engagement member attached to the bottom of the operation rod, thereby preventing the connection between the engagement member and the wires from being slackened when the operation rod is operated.

As apparent from the above, the object of the present invention is to provide a door mirror of the wire remote control type wherein the slackening of the wires which extend from the operation rod to the inside of the housing through the base and the fixed shaft can be prevented to always keep the wires tensioned precisely, so that the angle of the mirror can be reliably adjusted.

This and other objects as well as the merits of the present invention will become apparent from the following detailed description in reference to the accompanying drawings.

BRIEF DESCRIPTION OF THE DRAWING

FIG. 3 is a perspective view showing a wire slack preventing means developed in the case of the door mirror shown in FIG. 1.

FIG. 4 is a sectional view showing a mirror support structure in the case of the door mirror shown in FIG. 1.

FIG. 12 is a perspective view showing a still further example of the wire slack preventing means.

DETAILED DESCRIPTION OF THE PREFERRED EMBODIMENT

Figure 1:
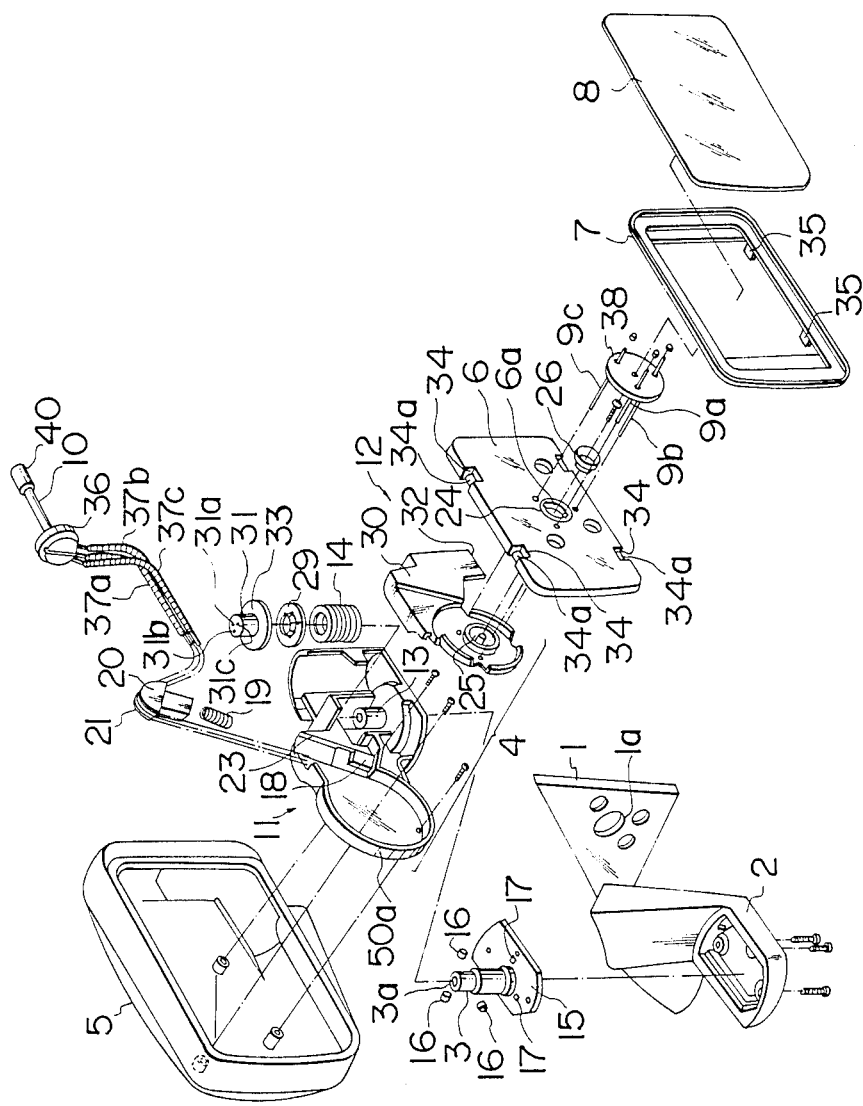
FIG. 1 is a perspective view showing an example of the door mirror of the present invention developed.

As shown in FIG. 1, a door mirror of the collapsible type according to the present comprises a base 2 fixed to the side of a door through a packing 1, a support means 4 freely rotatably attached to a fixed shaft 3 in the base 2, a mirror housing 5 attached to the support means 4 to house the latter, a mirror body base 6 freely swingably attached to the support means 4 through a pivot mechanism, a mirror body 7 freely detachably attached to the mirror body base 6, and a mirror 8 fitted into the mirror body 7 through cushion material (not shown), wherein three wires 9a, 9b and 9c connected to the mirror body base 6 can be pulled by the operation rod 10 attached to the base 2 to adjustably swing the mirror 8.

The base 2 has a hollow portion through which the wires are passed, and the fixed shaft 3 has also an hole 3a through which the wires are passed. The wires 9a, 9b and 9c which are connected to the operation rod 10 and which are held in tubes 37a, 37b and 37c, respectively, are guided to the side of the support means 4, passing through the inside of the base 2 and the hole 3a of the fixed shaft 3.

The support means includes a die-cast main bracket 11 and a resin-made sub-bracket 12.

Figure 2:
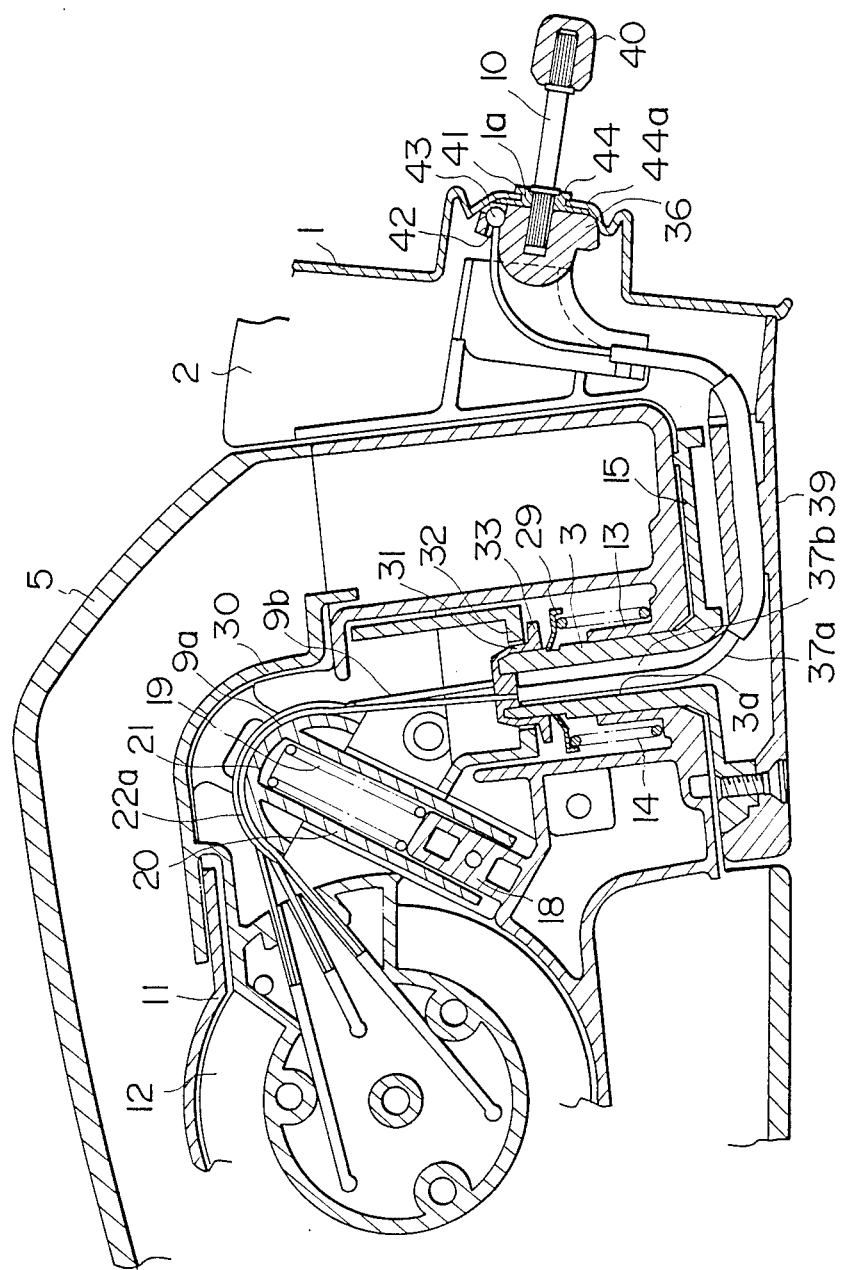
FIG. 2 is a partly-omitted sectional view showing a base and support members assembled in the case of the door mirror shown in FIG. 1.
Figure 5:
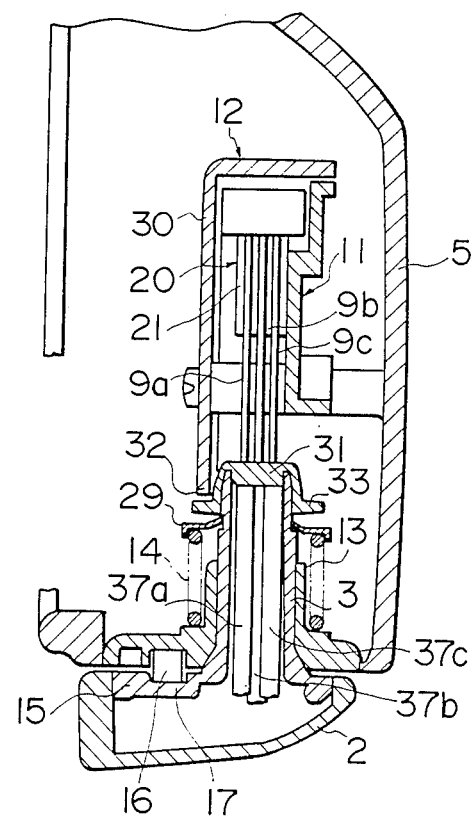
FIG. 5 is a sectional view showing wires inserted in the door mirror shown in FIG. 1.
Figure 6:
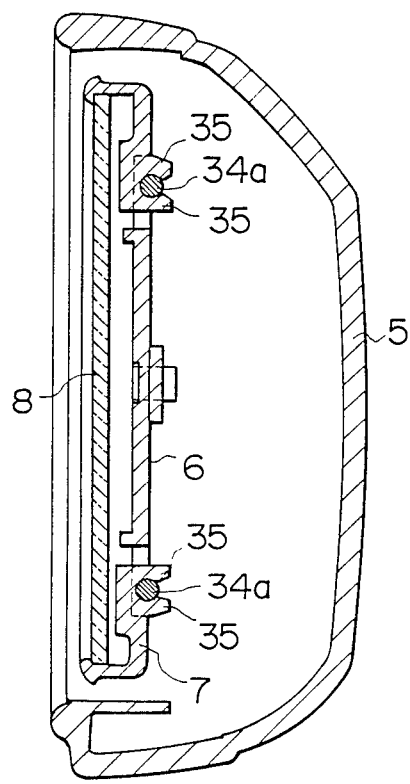
FIG. 6 is a sectional view showing a mirror body and its base connected in the case of the door mirror shown in FIG. 1.

The main bracket 11 has a cylindrical portion 13 positioned at the collapsing center of the door mirror. As shown in FIG. 2, the fixed shaft 3 located on the side of the base 2 is inserted through the cylindrical portion 13 and a push nut 29 is attached to that end of the fixed shaft 3 which is protruded from the cylindrical portion 13, through a coil spring 14, so that the main bracket 11 can be freely rotatably assembled on the base 2. To describe in more detail, the fixed shaft 3 is provided with a flange 15 at the bottom end thereof and the main bracket 11 is seated on this flange 15. Sandwiched between the upper surface of the flange 15 and the underside of the main bracket 11 is a stopper mechanism for stopping the main bracket 11 at a desired mirror setting position. According to this holder mechanism, plural lock members 16 attached to the main bracket 11 are elastically fitted into their corresponding lock recesses 17 on the flange 15, as shown in FIG. 5, and when the main bracket 11 is at the desired mirror setting position, the lock members 16 are fitted in their corresponding lock recesses 17 to stop the rotation of the main bracket 11.

When the mirror is once set at its desired position, therefore, the lock members 16 which are in the lock recesses 17 hold the mirror rigid enough to stand wind pressure and the like. When the door mirror is forcedly swung, the lock members 16 come out of the lock recesses 17 to thereby enable the door mirror to be collapsed along the door side. The lock members 16 mount on the upper surface of the flange 15 at this time, so that the support means 4 can be shifted upward.

The main bracket 11 is provided with a slack preventing means for the wires 9a, 9b and 9c, as shown in FIG. 2. The slack preventing means comprises a guide post 18 formed on the main bracket 11, a coil spring 19, a wire pressing member 20 fitted onto the guide post 18 with the coil spring 19 interposed between them, and a wire sliding portion 21 formed on the foremost end of the wire pressing member 21, wherein the wires 9a, 9b and 9c which are on the wire sliding portion 21 can be tensioned by the coil spring 19. To add more, the wire sliding portion 21 is of semi-circular shape, whose one end faces the opening of the fixed shaft 3. As shown in FIG. 3, the wire sliding portion 21 is provided with three grooves 22a, 22b and 22c in which the wires 9a, 9b and 9c are located, respectively. As shown in FIGS. 4 and 5, the wires 9a, 9b and 9c are guided, not tangled but parallel, by their corresponding grooves 22a, 22b and 22c toward the support means 4.

A certain tension is applied to the wires 9a, 9b and 9c through this slack preventing means, so that they can be kept tensioned even when they are expanded and contracted under temperature change and when the support means is shifted following the swinging of the door mirror, to thereby make them ready for their pulling operation. The main bracket 11 is also provided with a stepped guide portion 23 for the wire pressing member 20.

The sub-bracket 12 is fixed to the main bracket 11 by screws and it is provided with a cover 30 for covering the wire sliding portion 21. It is also provided at its front side with a pivot mechanism for supporting the mirror body base 6.

The cover 30 encloses the wire pressing member 20 from three sides and overlaps the upper rim of the main bracket 11 to cover the upper surface of the wire sliding portion 21, thereby preventing dust and others from approaching the wire sliding portion 21.

A part of the cover 30 extends downward and faces a cap 31 fitted onto the opened portion of the fixed shaft 3 to form a stopper 32 for stopping the cap 31 from coming out of the fixed shaft. In short, the cap 31 is fitted onto the opened end of the fixed shaft 3 and provided with three holes 31a, 31b and 31c through which the wires 9a, 9b and 9c are passed, and a flange 33 at the bottom end thereof, to which the foremost end of the stopper 32 is located adjacent. Therefore, the cap 31 can be easily attached to the fixed shaft 3 and also prevented from coming out of the fixed shaft 3 even if it should do so.

Figure 7:
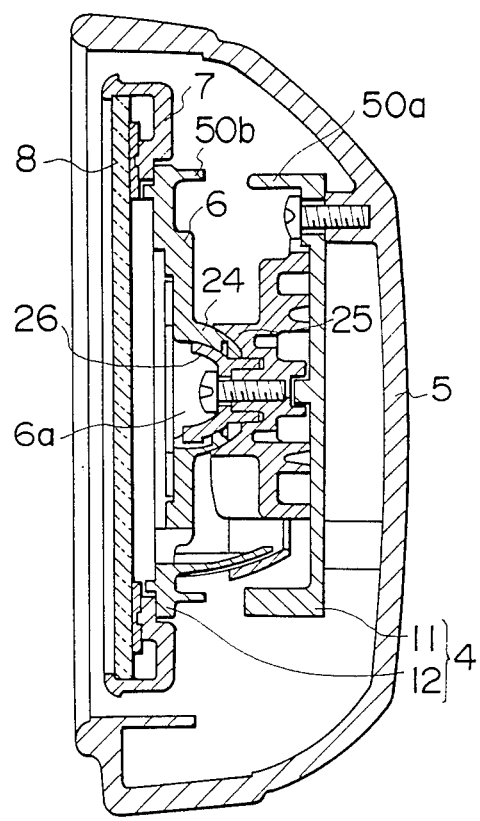
FIG. 7 is a sectional view showing the mirror support structure from a visual point different from that in FIG. 4.

As shown in FIG. 7, the pivot mechanism a ring-like portion 24 continuous from the mirror body base 6, a seat 25 formed on the sub-bracket 12, and a press member 26 attached to the seat 25, wherein the ring-like portion 24 is inserted onto the seat 25 through a hole 6a in the center of the mirror body base 6 and sandwiched there between the seat 25 and the press member 26. Namely, the ring-like portion 24 is formed as a convexed sphere at the outer surface thereof and freely slidably and closely contacted with the concaved-sphere-like inner face of the seat 25. In addition, a part of the inner surface of the ring-like portion 24 is also freely slidably and closely contacted with the convexed-sphere-like outer face of the press member 26. The press member 26 is screwed to the seat 25. The ring-like portion 24 is thus sandwiched between the seat 25 and the press member 26 and held there freely shiftable along the spherical faces to freely swingably support the mirror body base 6.

The mirror body base 6 thus supported is provided with plural engagement recesses 34 for engaging with the mirror body 7. The engagement recess 74 is a cutaway portion at the sides of the mirror body base 6, having a rod 34a therein, which is fitted into a socket 35 on the back of the mirror body 7. The mirror body 7 can be thus attached to the mirror body base 6 detachably.

As shown in FIGS. 4 and 7, the mirror body base 6 and the main bracket 11 are provided with stoppers 50a and 50b for limiting the swinging of the mirror body base 6. The stoppers 50a and 50b are ring-shaped projected pieces opposed to each other, and when the swinging angle of the mirror body 7 exceeds over a certain value, they are contacted with each other to limit the swinging of the mirror body 7. The unnecessary swinging of the mirror body base 6 can be thus limited and the detachment of the mirror body 7 can be easily achieved.

One end of each of the wires 9a, 9b and 9c is fixed to the engagement member 36 at the bottom end of the operation rod 10, while the wires in the tubes 37a, 37b and 37c are guided to the wire sliding portion 21, passing through the base 2, fixed shaft 3, and holes 31a, 31b and 31c in the cap 31, and then connected to a connector plate 38 at their other ends, passing through holes in the sub-bracket 12 and mirror body base 6.

The connector plate 38 is held in front of the mirror body base 6 by the tension of the wires 9a, 9b and 9c. When the operation rod is operated, therefore, the wires 9a, 9b and 9c are selectively pulled to swing the connector plate 38 together with the mirror body base 6, so that the angle of the mirror 8 can be adjusted.

Figure 8:
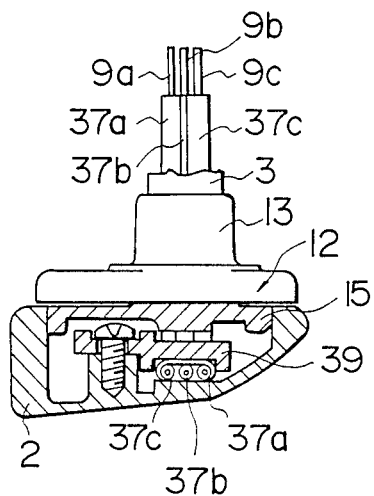
FIG. 8 is a sectional view partly showing a wire holding structure in the base of the door mirror shown in FIG. 1.

Each of the tubes 37a, 37b and 37c is flexible and they hold the wires 9a, 9b and 9c slidable therethrough. Those portions of the tubes 37a, 37b and 37c which are located in the base 2 are fixed, closely side by side, in a holder member 39 attached to the inner wall of the base 2, as shown in FIGS. 2 and 8. Therefore, the tubes 37a, 37b and 37c are not slackened when the wires 9a, 9b ad 9c in them are being pulled, thereby holding the wires to be precisely pulled.

Figure 9:
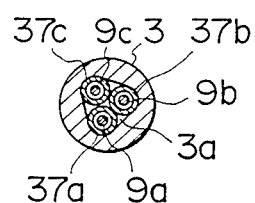
FIG. 9 is a sectional view showing a wire holding structure in a fixed shaft of the door mirror shown in FIG. 1.

In addition, those portions of the tubes 37a, 37b and 37c which are located in the hole 3a of the fixed shaft 3 are held integrally bound depending upon the shape of the hole 3a, as shown in FIG. 9. In short, the hole 3a in the fixed shaft 3 is formed as a substantially regular triangle and the tubes 37a, 37b and 37c are located, closely contacted one another, at the vertexes of the triangle. The slackening of the tubes 37a, 37b and 37c in the fixed shaft can be thus prevented to improve the transmission efficiency of each of the wires 9a, 9b and 9c.

As shown in FIG. 2, the operation rod 10 has a knob 40 forcedly fitted onto the front end portion thereof, and the engagement member 36 forcedly fitted and fixed to the bottom end portion thereof through a washer 41. The engagement member 36 is swelled in the radius direction of the operation rod 10 and three holes 42 are formed in the engagement member 36 along the operation rod 10. Balls 43 each attached to the front end of each of the wires 9a, 9b and 9c are received in the holes 42 and held there, respectively. The wires 9a, 9b and 9c are thus connected to the operation rod 10.

The washer 41 is positioned nearer to the front end of the operation rod 10 than the engagement member 36 is. The washer 41 has such a shape that can shield a part of each of the holes 42. The balls 43 in the holes 42 can be thus prevented from coming out of the holes 42 in the front end direction of the operation rod 10. Therefore, the wires 9a, 9b and 9c can be reliably operated by the operation rod 109 to achieve their precise transmission.

The washer 41 is also provided with a portion 44 which is fitted into the hole 1a of the packing 1. This portion 44 includes a protrusion projected from the washer 41 and a ring-shaped groove 44a formed along the outer circumference of the protrusion. The groove 44a receives the outer rim of the hole 1a in the packing 1 to close the hole 1a. That portion of the groove 44a in which the outer rim of the hole 1a is sandwiched is formed cylindrical and flexible to freely follow the swinging movements of the operation rod 10, thereby preventing the outer rim of the hole 1a from coming out of the portion 44. The hole 1a is formed to have a diameter large enough to allow the knob 40 of the operation rod 10 to pass therethrough, but it is reliably and watertightly closed by the washer 41.

Figure 10:
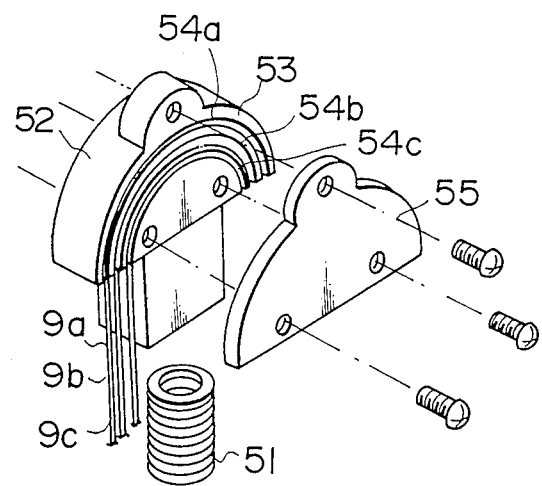
FIG. 10 is a perspective view showing another example of the wire slack preventing means developed.

FIG. 10 is a perspective view showing another example of the wire slack preventing means developed. The wire slack preventing means includes a coil spring 51, a pressing body 52 urged by the spring 51, a wire sliding portion 53 formed on a side of the pressing body 52, three grooves 54a, 54b and 54c through which the wires 9a, 9b and 9c are guided, and a cap member 55 which is screwed onto the wire sliding portion 53 to close the groove 54a, 54b and 54c. When the wire slack preventing means is arranged like this, the wires 9a, 9b and 9c can be prevented from coming out of the wire sliding portion 53 even if their tensions are changed quickly, thereby enabling them to be reliably operated. Since the grooves 54a, 54b and 54c are closed by the cap member 55, the wire sliding portion 53 can be formed on a side of the wire pressing body 52, thereby making it possible to freely select the passages through which the wires 9a, 9b and 9c are guided so as to leave the design of the door mirror free to a larger extent.

Figure 11:
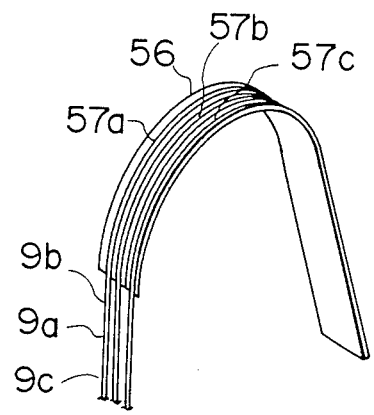
FIG. 11 is a perspective view showing a further example of the wire slack preventing means.

FIG. 11 is a perspective view showing a further example of the wire slack preventing means. This wire slack preventing means is a curved plate spring provided with a wire sliding portion 56 having three groove 57a, 57b and 57c formed thereon, through which the wires 9a, 9b and 9c are guided. When the wire slack preventing means is arranged like this, neither the wire pressing body nor the spring member is needed to reduce the number of parts used.

FIG. 12 is a perspective view showing a still further example of the wire slack preventing means. This wire slack preventing means includes a pulley-like wire pressing body 58, a coil spring 59 from which the wire pressing body 58 is freely rotatably suspended, a wire sliding portion 61 formed on the outer circumferential face of the wire pressing body 58, and three grooves 62a, 62b and 62c through which the wires 9a, 9b and 9c are guided, wherein the angle of the mirror 8 can be more smoothly adjusted.

In the case of the above-described wire slack preventing means, each has served to tension all of the three wires 9a, 9b and 9c, but every wire may be tensioned by a wire slack preventing means. If so, each of the wires 9a, 9b and 9c can be more precisely tensioned.

Although the present invention has been described referring to its preferred embodiments, it should be understood that various changes and modifications can be added to the present invention without departing from the scope and spirit of the present invention.

I claim:

1. A door mirror assembly for use in a vehicle, comprising:
   a base fixed to a door;
   a fixed shaft erected in said base;
   a housing assembled with said fixed shaft through a support means;
   a mirror freely swingably supported in said housing by said support means;
   plural wires pulled by an operation rod, which is attached to said base, to swing said mirror; and
   a wire slack preventing means, located at said housing, for applying a predetermined tension to the wires,
   wherein the wire slack preventing means includes a wire pressing body on which said wires are frictionally slid, and a spring member by which said wire pressing body is urged to press against said wires; and further,
   the wires are inserted through tubes respectively and introduced from the operation rod into the housing through the base, and the tubes are held by a holder member located in the base.

2. A door mirror assembly according to claim 1, wherein said wire slack preventing mean further comprises a wire sliding portion provided with grooves through which the wires are guided.

3. A door mirror assembly according to claim 2 wherein the fixed shaft has a hole extending its length, and the wires and tubes extend in said fixed shaft, and the tubes are held in said fixed shaft and closely contacted thereto.

4. A door mirror assembly according to claim 3 wherein a cap member is attached to the wire sliding portion to close a part of the grooves 5. A door mirror assembly for use in a vehicle, comprising:
   a base fixed to a door;
   a fixed shaft erected on said base;
   a housing assembled with said fixed shaft through a support means;
   a mirror freely swingably supported in said housing by said support means;
   plural wires pulled by an operation rod, which is attached to said base, to swing said mirror; and
   a wire slack preventing means, located in said housing, for applying a predetermined tension to the wires,
   wherein the wire slack preventing means includes a wire pressing body on which the wires are frictionally slid, and a spring member by which the wire pressing body is urged to press the wires, in which said wire pressing body is a pulley freely rotatably suspended from a spring member; and further,
   the wires are inserted through tubes respectively and introduced from the operation rod into the housing through the base, and the tubes are held by a holder member located in the base.

6. A door mirror assembly according to claim 1 wherein an enlarged point on one end of each of the wires is engaged with an engagement member located at the bottom portion of the operation rod and a washer is located adjacent to the engagement member and on that side of the engagement member which is opposite to the wires to prevent the connection between the enlarged points of the wires and the engagement member from being loosened following the operation of the operation rod.

7. A door mirror assembly for use on a vehicle door, comprising:
   an operation rod mounted on one side of the door;
   a housing mounting on an opposed side of the door;
   a base mounted intermediate the housing and the door;
   a mirror secured at a pivot point within said housing and pivotable with respect to said housing;
   a plurality of wires interconnecting said operation rod and said mirror, said wires adapted to transmit motion between said operation rod and said mirror; and
   tensioning means engaging said plurality of wires, located in said housing and responsive to changes in tension in said wires, for continuously tensioning said wires at a point close to the pivot point of said mirror.

* * * * *